US006697712B1

(12) United States Patent
Bertini et al.

(10) Patent No.: US 6,697,712 B1
(45) Date of Patent: Feb. 24, 2004

(54) DISTRIBUTED CABLE FEED SYSTEM AND METHOD

(75) Inventors: Glen J. Bertini, Tacoma, WA (US); Keith W. Lanan, Renton, WA (US); William Richard Stagi, Seattle, WA (US)

(73) Assignee: Utilx Corporation, Kent, WA (US)

(*) Notice: Subject to any disclaimer, the term of this patent is extended or adjusted under 35 U.S.C. 154(b) by 0 days.

(21) Appl. No.: 09/559,364

(22) Filed: Apr. 24, 2000

(51) Int. Cl.[7] .............................. G05D 7/00; H02G 9/00

(52) U.S. Cl. .................... 700/282; 34/437; 137/599.11; 174/10; 174/37

(58) Field of Search ....................... 700/9, 90, 281–283; 702/188; 239/302; 174/8, 10, 37; 523/173; 34/104, 437; 137/599.01, 599.09, 599.11

(56) References Cited

U.S. PATENT DOCUMENTS 3,595,982 A * 7/1971 Kafka ....................... 174/15.5
3,679,810 A 7/1972 Nutt
3,866,678 A * 2/1975 Jeter ....................... 340/854.3
4,372,988 A 2/1983 Bahder
4,545,133 A 10/1985 Fryszczyn et al.
4,766,011 A 8/1988 Vincent et al.
4,925,153 A * 5/1990 Romer .................... 251/30.01
4,945,653 A 8/1990 Eager, Jr. et al.
4,961,961 A 10/1990 Vincent et al.
5,173,982 A * 12/1992 Lovett et al. .................. 14/22
5,191,173 A 3/1993 Sizer et al.
5,244,184 A * 9/1993 Larseneur ................... 251/294
5,372,840 A 12/1994 Kleyer et al.
5,372,841 A 12/1994 Kleyer et al.
5,632,802 A 5/1997 Grgich et al.
5,807,422 A 9/1998 Grgich et al.
5,865,212 A * 2/1999 Gaines .................. 137/599.11
6,063,845 A * 5/2000 Nylander .................... 524/284
6,510,350 B1 * 1/2003 Steen et al. ..................... 700/9
6,553,336 B1 * 4/2003 Johinson et al. ............ 702/188

* cited by examiner

*Primary Examiner*—Albert W. Paladini
*Assistant Examiner*—Paul Rodriguez
(74) *Attorney, Agent, or Firm*—Christensen O'Connor Johnson Kindness PLLC

(57) ABSTRACT

The present invention provides a distributed feed system (10) for use in a cable system (12), where the cable system includes at least two cable subsystems (14*a*–14*d*). The distributed feed system is adapted to feed a performance-enhancing compound into each of the cable subsystems. The distributed feed system includes a central feed station (22) having a tank (24) for holding the performance-enhancing compound. The distributed feed system further includes an impermeable or low-permeable distribution conduit (26*a*–26*c*) that connects the central feed station to each of the cable subsystems to permit distribution of the performance-enhancing compound therethrough to each of the cable subsystems.

49 Claims, 9 Drawing Sheets

DISTRIBUTED CABLE FEED SYSTEM AND METHOD

FIELD OF THE INVENTION

The present invention relates to a cable system, and more particularly, to a system and method for feeding a compound to the entire cable system to enhance its performance.

BACKGROUND OF THE INVENTION

Underground solid dielectric electrical cable technology was developed and implemented because of its aesthetic advantages, immunity from weather-induced failure, and its relative cost effectiveness compared to earlier generations of underground cable that used a solid-liquid dielectric, namely, paper and oil. Currently, underground solid dielectric electrical cables generally include a number of copper or aluminum strands surrounded by a semiconducting or insulating strand shield, a layer of solid dielectric insulation, and an insulation shield.

Underground solid dielectric electrical cables were initially touted as having a useful life of 25–40 years. However, the useful life of such cables installed before 1985 has rarely exceeded 20 years, and has occasionally been as short as 10–12 years. In particular, the solid insulation tends to degrade over time because water enters the cable and forms water trees. Water trees are formed in the insulation when medium- to high-voltage alternating current is applied to a polymeric dielectric (insulator) in the presence of water and ions. As water trees grow, they compromise the dielectric properties of the polymer until the insulation fails.

To address the water tree issue, the conventional wisdom has been to overdesign a brand-new cable. For example, a brand-new power cable is typically designed to have an AC breakdown strength of 800 to 1000 volts/mil, though with common insulation thickness only 400 volts/mil is actually required for a cable to reliably operate. This 2 to 2.5 times overdesign is required because the AC breakdown performance of a new cable begins to degrade as soon as the cable is installed and put in service. The cable industry has spent the last twenty years improving the materials and manufacturing techniques used in forming cables, in particular, the cable insulation and strand shield. This approach, however, increases the costs of manufacturing cables because it often requires expensive insulation materials.

Water tree growth can be eliminated or retarded by removing or minimizing the water or ions. One approach for accomplishing this in old cables is to continuously inject a desiccant fluid into the interstices between the strands of electrical cables. For example, U.S. Pat. No. 4,545,133 to Fryszczyn et al. describes a method of continuously injecting desiccant fluid, typically a dry gas, into one end of a cable and continuously flushing the water-rich fluid out of the other end of the cable. The fluid travels generally axially along the interstices of the cable. U.S. Pat. No. 4,372,988 to Bahder, U.S. Pat. No. 4,766,011 to Vincent, and U.S. Pat. Nos. 5,372,840 and 5,372,841 to Kleyer have taught methods to introduce liquid materials that diffuse radially from the strands of installed power cables to treat existing water trees. Bahder taught the use of non-water-reactive materials, while Vincent and Kleyer introduced an improved concept, which incorporated water-reactive functionality to dry the cable in a single step. The present treatment approaches, however, suffer from several disadvantages.

First, continuous axial flushing of desiccant requires that a substantial amount of desiccant be continuously fed to a cable. Equipment for continuous feeding must be frequently refilled or maintained, making the maintenance cost of such a system quite high.

Second, axial desiccation establishes a concentration gradient of water in the cable insulation with a very low value, near zero, adjacent the cable strands, but an increasing value at a point radially removed from the cable center. Axial desiccation, at best, can reduce the rate of water tree growth, but it cannot entirely eliminate it.

Third, continuous feeding of non-oligomerizing material will result in permeation or exudation of treatment material from the cable into the environment. Ensuing environmental damages and loss of treatment material are some of the undesirable results of such permeation or exudation.

Fourth, continuous, unrestrained feeding of non-water-reactive or water-reactive treatment materials may cause a condition of “supersaturation”, wherein the amount of treatment fluid that is delivered to the cable exceeds the amount of fluid required to optimally treat the cable. Supersaturation eventually swells the polymer material forming the cable to such an extent that the mechanical strain bursts the cable and it fails catastrophically.

Fifth, because a separate feeding system is required to feed each cable or small group of cables linked in series, a large number of such systems must be installed and maintained at substantial cost in order to treat the multitude of cables in a typical distribution cable circuit. Systems, which link a small number of cables in series, suffer the disadvantage that the effectiveness of the axial desiccation is compromised as moisture from the first cable is carried into subsequent segments.

Sixth, when a cable termination is enclosed in an insulating housing, or “dead-front” device, feeding a desiccant fluid to such a dead-front termination compromises its safety characteristics.

Seventh, the prior art addresses the rejuvenation of previously installed cables and cannot be applied to brand-new cables for the purpose of altering their fundamental design to eliminate the need for overdesign.

The present invention provides a system and a method for overcoming all of these disadvantages.

SUMMARY OF THE INVENTION

The present invention provides a distributed feed system for use in a cable system, where the cable system includes at least two cable subsystems or segments. The distributed feed system is adapted to feed a performance-enhancing compound into each of the cable subsystems. The distributed feed system includes a central feed station having a tank for holding the performance-enhancing compound. The distributed feed system further includes an impermeable or low-permeable distribution conduit that connects the central feed station to each of the cable subsystems to permit distribution of the performance-enhancing compound therethrough to each of the cable subsystems.

In accordance with one aspect of the present invention, the central feed station further includes a flow control system coupled to the tank, which is adapted to controllably release the performance-enhancing compound from the tank. The flow control system may be an osmotic flow control system using a permeable membrane. The area of the membrane available for the compound permeation may be varied so as to control the compound permeation through the osmotic flow control system.

In accordance with another aspect of the present invention, one or more osmotic flow control devices may be placed along one or more cables forming the cable system to control diffusion of the performance-enhancing fluid through each cable and, hence, through the entire cable system.

In accordance with yet another aspect of the present invention, the distributed feed system further includes a communication network including a central database. The central feed station includes a data communication device for transmitting data, relating to the central feed station, to the central database via the network.

In accordance with still another aspect of the present invention, the distribution conduit for transporting the performance-enhancing compound is integrally formed with a cable. For example, one or more neutral wires within a cable may be replaced with one or more tubes to serve as distribution conduit(s).

In accordance with a further aspect of the present invention, the cable may include a permeable conduit axially extending therein. The permeable conduit is provided for purposefully carrying the performance-enhancing compound through the cable, and for permitting the compound to migrate generally radially through the permeable conduit into the cable. The distribution conduits of the distributed feed system may be advantageously coupled to these permeable conduits to efficiently transport the performance-enhancing compound to each of the cable subsystems.

In accordance with a still further aspect of the present invention, the material used to form the cable, including its permeable conduit, may be selectively chosen so as to control diffusion of the compound through the cable.

In accordance with yet a further aspect of the present invention, a shielded dielectric tube including a dielectric inner tube and a semiconducting or conducting outer tube surrounding the inner tube are provided. The shielded dielectric tube may be used to provide for a complete dead-front termination while safely feeding a performance-enhancing fluid into the termination.

In accordance with an even further aspect of the present invention, the performance-enhancing compound comprises a silane, which can be readily altered to control the permeation rate and the extent of oligomerization of the compound. By controlling the permeation rate and the extent of oligomerization of the compound, one may control the amount of compound delivered to the cable and the maximum extent of oligomerization of the fully hydrolyzed compound so as to mitigate the problem of supersaturation.

In accordance with yet a further aspect of the present invention, a cable may be designed without the overdesign universal to solid dielectric cables manufactured and installed today. Specifically, the present invention allows the dielectric performance of the cable to remain at or very near 1000 volts/mil for an indefinite period of time, thereby reducing the required insulation thickness by up to 60%. Further, the materials used for the solid dielectric and the shields in the cable system can be made of less expensive materials as the cable will remain totally dry over the lifetime of the cable. The present invention provides various advantages.

First, since multiple-cable subsystems, or cables, are fed with a performance-enhancing compound using a central feed station, the costs of maintaining the single central feed station are significantly lower than the costs of maintaining multiple feeding equipment as required in the past.

Second, because diffusion of a performance-enhancing compound through each cable and throughout the entire cable system is controlled by various means, continuous axial flushing of treatment fluid is not required. Axial delivery along the length of the cable is controlled by means such as osmotic flow control devices, while radial diffusion may be controlled by carefully selecting the materials forming the cable, such as the material used to form the permeable conduit provided within the cable. Radial diffusion may further be controlled by manipulating the chemical structure or the degree of oligomerization of the performance-enhancing compound. Controlled diffusion allows for only an optimal amount of performance-enhancing compound to be fed into the cable system, reducing accidental spill and waste. Further, controlled diffusion prevents a "supersaturation" condition.

Third, continuous feeding and controlled diffusion of the performance-enhancing compound, when applied in a new cable, allow for the insulation of the cable to maintain its initial dielectric properties substantially intact. This obviates the need to overdesign a new cable, and allows for the use of less expensive materials and particularly thinner insulation in constructing a new cable. Fourth, the shielded dielectric tube of the present invention allows for formation of a complete "dead-front" termination while safely feeding a performance-enhancing fluid into the termination.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
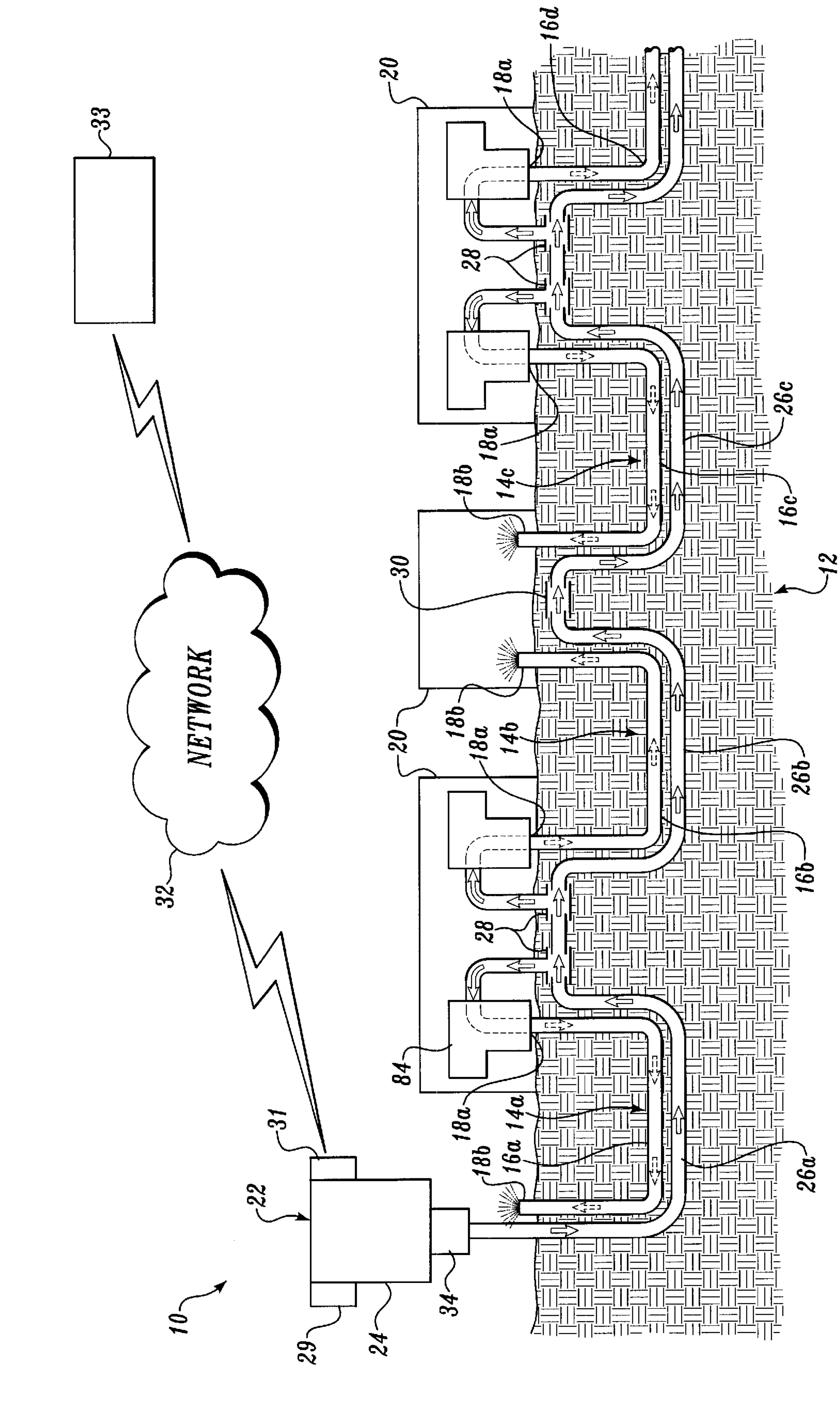
FIG. 1 is a schematic overview of one embodiment of a distributed feed system of the present invention.

FIG. 1 schematically illustrates one embodiment of a distributed feed system formed in accordance with the present invention. The distributed feed system 10 is for use in a cable system 12, which includes a plurality of cable subsystems 14*a*, 14*b*, 14*c*. In the illustrated embodiment, each cable subsystem 14*a*, 14*b*, or 14*c* is formed of a cable 16*a*, 16*b*, or 16*c* extending between one termination 18*a* to another 18*b*, and two contiguous cables are coupled within a transformer 20. The distributed feed system 10 is capable of feeding a performance-enhancing fluid into each of the cable subsystems 14*a*–14*c*, or the cables 16*a*–16*c*. Specifically, the distributed feed system 10 includes a central feed station 22 having a tank 24 for holding the performance-enhancing fluid. The distributed feed system 10 further includes impermeable or low-permeable distribution conduits 26*a*, 26*b*, and 26*c*, which connect the central feed station 22 with each of the cable subsystems 14*a*–14*c* to allow for distribution of the performance-enhancing fluid therethrough to each of the cable subsystems 14*a*–14*c*.

In operation, the performance-enhancing fluid is injected from the tank 24 of the central feed station 22 into the first segment of the distribution conduit 26*a* in the direction indicated by an arrow. "Tee" connectors 28, as well known in the art, are suitably arranged to provide a continuous flow of the fluid to the second segment of the distribution conduit 26*b*, while allowing the fluid to enter the cables 16*a* and 16*b* via their respective terminations 18*a*. The fluid will then flow through the cables, for example, through the interstices between the conductive strands of the cables, to enhance dielectric properties of the cables. In FIG. 1, the directions of the fluid flowing through the cables are indicated by dotted arrows. The second segment of the distribution conduit 26*b* is coupled to the third segment of the distribution conduit 26*c*, using a conventional tube fitting 30, to allow for a further continuous flow of the fluid to the third segment of the distribution conduit 26*c* as indicated by an arrow. At a downstream end of the third segment of the distribution conduit 26*c*, "tee" connectors 28 are arranged as before to provide a continuous flow of the fluid to the contiguous segment of the distribution conduit while guiding the fluid to enter the cables 16*c* and 16*d* via their respective terminations 18*a*.

Thus, the distributed feed system of the present invention allows for a single feed station to feed multiple cable subsystems with a performance-enhancing fluid. It should be understood that the cable system arrangement of FIG. 1 is provided for an illustrative purpose only, and the distributed feed system of the present invention may be applied in any other cable system arrangement, as will be apparent to those skilled in the art. Specifically, the present invention may be used in various arrangements of information conducting cables, including but not limited to low-voltage power cables (secondary cables), medium-voltage power cables or underground residential distribution (URD) cables, transmission voltage power cables, control cables, and communication cables including conductive pair, telephone, and digital communication. It should also be understood that a cable for transmitting information as used in the present description includes not only electric cables, but also light-transmitting cables.

Still referring to FIG. 1, the central feed station 22 is described in detail. The tank 24 of the central feed station 22 is made of material, preferably metal, that is impermeable to water and the performance-enhancing fluid, such as desiccant or other cable treatment fluid. Preferably, the performance-enhancing fluid is dimethyldimethoxysilane (DMDM) or ethoxy or propoxy equivalents or partial hydrolyzates thereof. DMDM reacts and polymerizes with the water residing in the microvoids within the cable insulation or diffusing in from the cable exterior, and fills the microvoids with a dielectric fluid to prevent the growth of water trees. Other treatment fluids may also be used to enhance other cable properties, such as corrosion inhibition, plasticizer replacement, and antioxidant replacement. Preferably, tank 24 is metallic. The central feed station 22 needs to be periodically visited by maintenance personnel to refill the fluid and also to confirm that the distributed feed system is properly functioning.

For example, in the event that a leak in the cable system 12 is detected, the central feed station 22 may be used to inject the distribution conduits 26*a*–26*c* with a tracer fluid to aid in the identification of a fault or hole in the cable system 12. As a nonlimiting example, such tracer fluids include, in pure forms or mixtures, helium, $SF_6$, methane, ethane, propane, butane, or any other gas that is detectable with a hydrogen ion detector, or a gas of an obvious odor, such as a mixture of nitrogen and a mercaptan.

Optionally, the central feed station 22 includes a data communication device 31, such as a radio, preferably a cellular radio or similar distributed communication technology device. In this case, the distributed feed system 10 further includes a communication network 32, such as the Internet, which includes a central database 33. The data communication device 31 may gather and transmit data, relating to the performance or condition of the central feed station, to the central database 33 via the network 32. For example, an electronic level measurement device 29, as known in the art, may be attached to the tank 24 for measuring the remaining amount of the performance-enhancement fluid left in the tank, and the measurement obtained by the level measurement device 29 may be communicated to the central database 33 via the network 32. In this way, the central database 33 may monitor multiple central feed stations. The data communication device 31 may be adapted to transmit data, relating to the central feed station, to the central database 33 periodically. Alternatively, the communication device 31 may be adapted to transmit data to the central database 33 upon an occurrence of a predetermined event, such as when a certain element, such as the level measurement device, is not functioning within normal operational parameters. The central database 33 can then be queried to determine when individual feed stations require maintenance attention.

Preferably, the central feed station 22 includes a flow control system 34 coupled to the tank 24 to controllably release the performance-enhancing fluid from the tank. Steady and slow fluid flow from the tank in turn ensures that an accidental leak or spill from the distributed feed system will be of minimum magnitude. The flow control system 34 may take various configurations.

First, the flow control system 34 may include one or more very small orifices. By changing the size and number of the orifices, one may achieve a desired flow rate of the performnance-enhancing fluid therethrough.

Second, the flow control system 34 may include a shutoff valve and a flow measurement instrument, as known in the art, which is coupled to the shutoff valve. The flow measurement instrument is arranged to actuate and close the shutoff valve upon measurement of a flow rate in excess of a predetermined value.

Third, the flow control system 34 may be an osmotic flow control device. For example, an osmotic flow control device may be formed with a permeable membrane and a frame placed over the membrane to expose a predetermined area of the membrane through the frame to the performance-enhancing fluid. Two nonlimiting embodiments of such an osmotic flow control device are illustrated in FIGS. 2A, 2B and 3A, 3B.

Figure 2A:
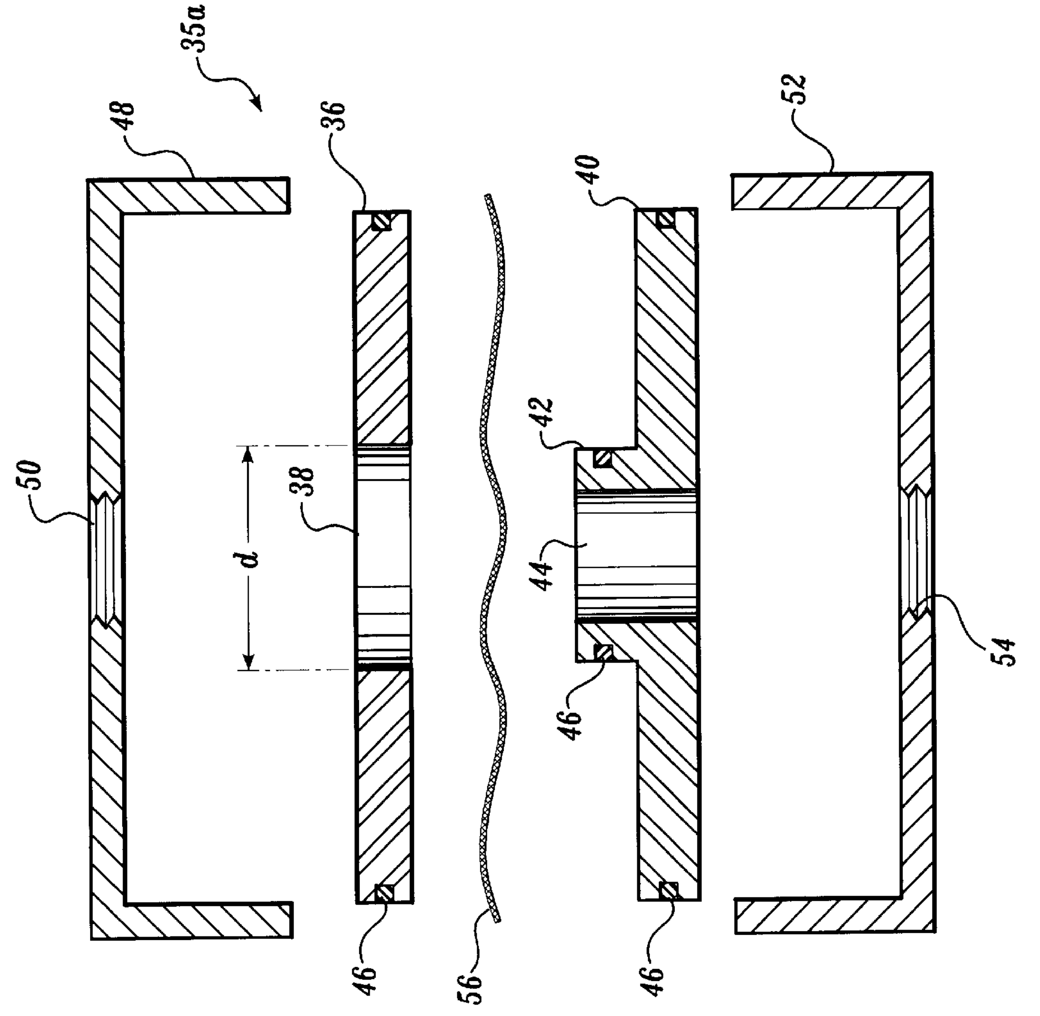
FIGS. 2A and 2B illustrate one embodiment of an osmotic flow control system formed in accordance with the present invention.

In FIG. 2A, an osmotic flow control device 35*a* includes an upper washer 36 including a circular aperture 38 having a diameter "d", and a lower washer 40 including a boss 42, which is formed and sized to be received within the aperture 38 of the upper washer 36. The lower washer 40 also includes a bore 44 that axially extends through the boss 42. O-rings 46 are provided along the outer periphery of the upper washer 36, the lower washer 40, and the boss 42. In the illustrated embodiment, an upper housing 48 with a threaded opening 50 is provided to receive the upper washer 36, and a lower housing 52 with a threaded opening 54 is provided to receive the lower washer 40, so as to conveniently couple the osmotic flow control device 35*a* in-line within the distributed feed system using threaded connections. Means other than threaded connections may also be used.

Figure 2B:
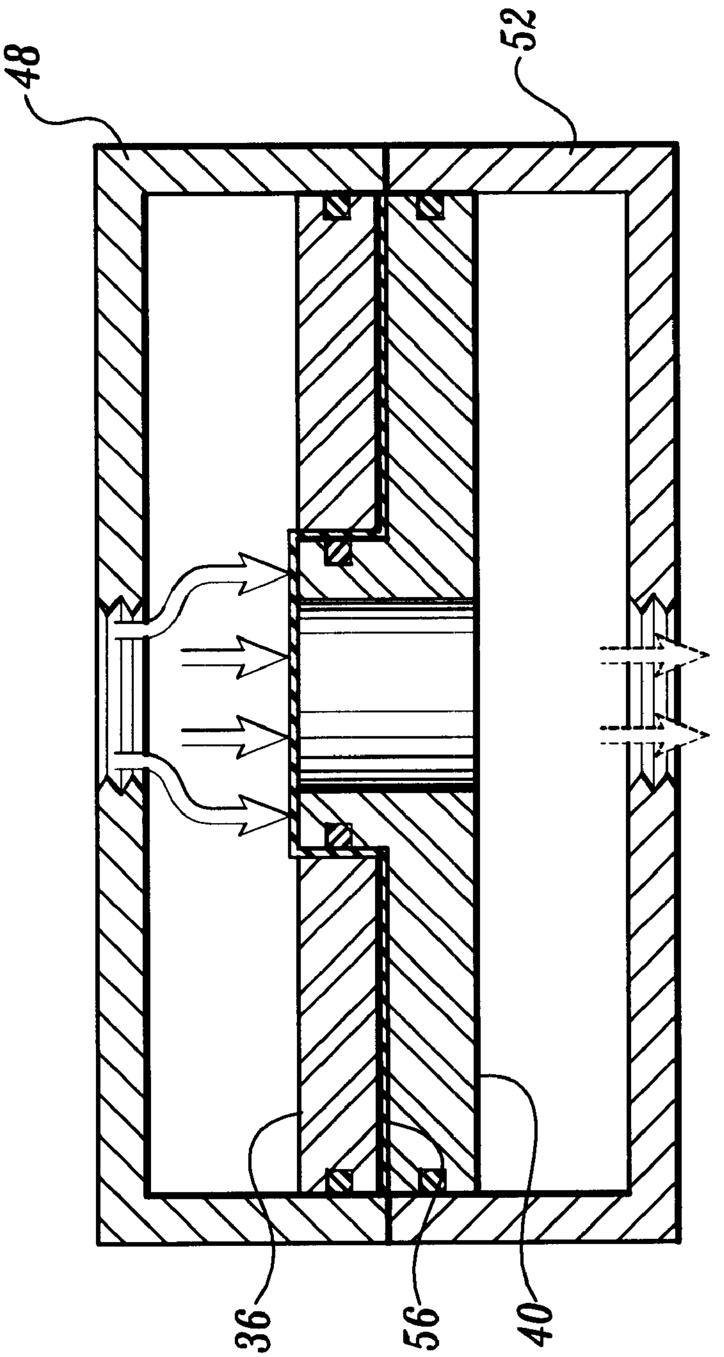

Referring additionally to FIG. 2B, a permeable membrane 56 is inserted between the upper and lower washers 36, 40, and the upper and lower washers 36, 40 are assembled together. The permeable membrane 56 may be formed of any suitable material, selected to be permeable to the performance-enhancing compound used in a particular application. When assembled, only the area of the aperture 38 of the upper washer 36, or $\pi$ $(\frac{1}{2}d)^2$, is available for the fluid to permeate through the membrane 56, as indicated by arrows. The fluid permeated through the membrane 56 then travels downstream as indicated by dotted arrows. By varying the size of the aperture 38 of the upper washer 36, while maintaining the exterior (outer diameter) size of the upper and lower washers constant, one may control the flow of the performance-enhancing fluid through the osmotic flow control device 35*a*. While the aperture 38 is illustrated to have a circular cross section in the illustrated embodiment, the aperture 38 may have other cross-sectional shapes within the scope of the present invention.

Figure 3A:
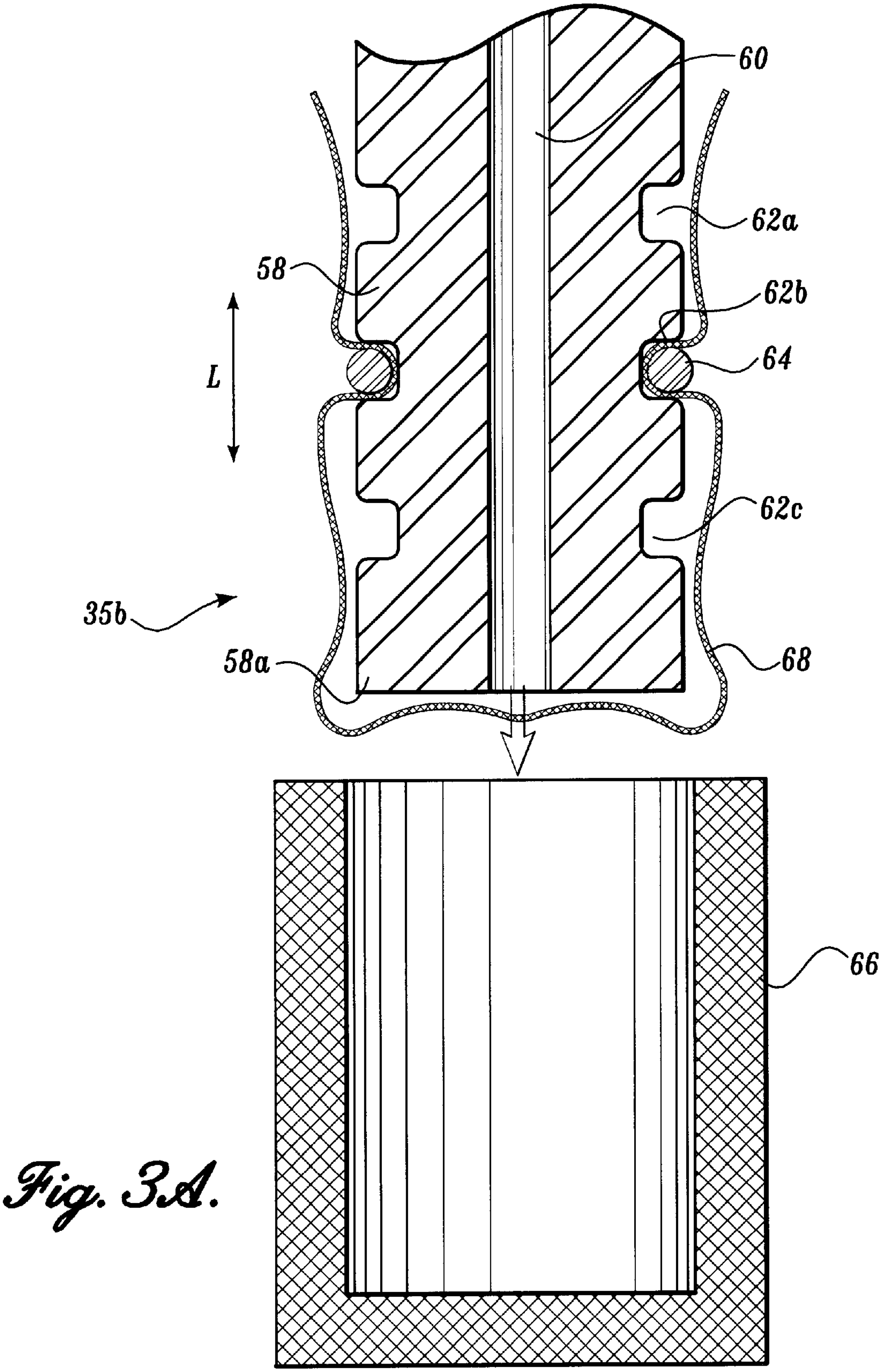
FIGS. 3A and 3B illustrate another embodiment of an osmotic flow control system formed in accordance with the present invention.

In FIG. 3A, another embodiment of an osmotic flow control device 35*b* includes a male portion 58 having a length dimension extending in the direction of an arrow "L". The male portion 58 includes a passage 60 extending therethrough. In the illustrated embodiment, the male portion 58 includes a plurality of circumferential grooves 62*a*, 62*b*, and 62*c*, defined along its length to receive an O-ring 64. The osmotic flow control device 35*b* further includes a female portion 66, which may be made of foraminous material, such as sintered metal. The female portion 66 is shaped to receive the male portion 58 therein. A permeable membrane 68 is formed in a substantially cylindrical shape with a sealed bottom to enclose one longitudinal end 58*a* of the male portion 58.

Figure 3B:
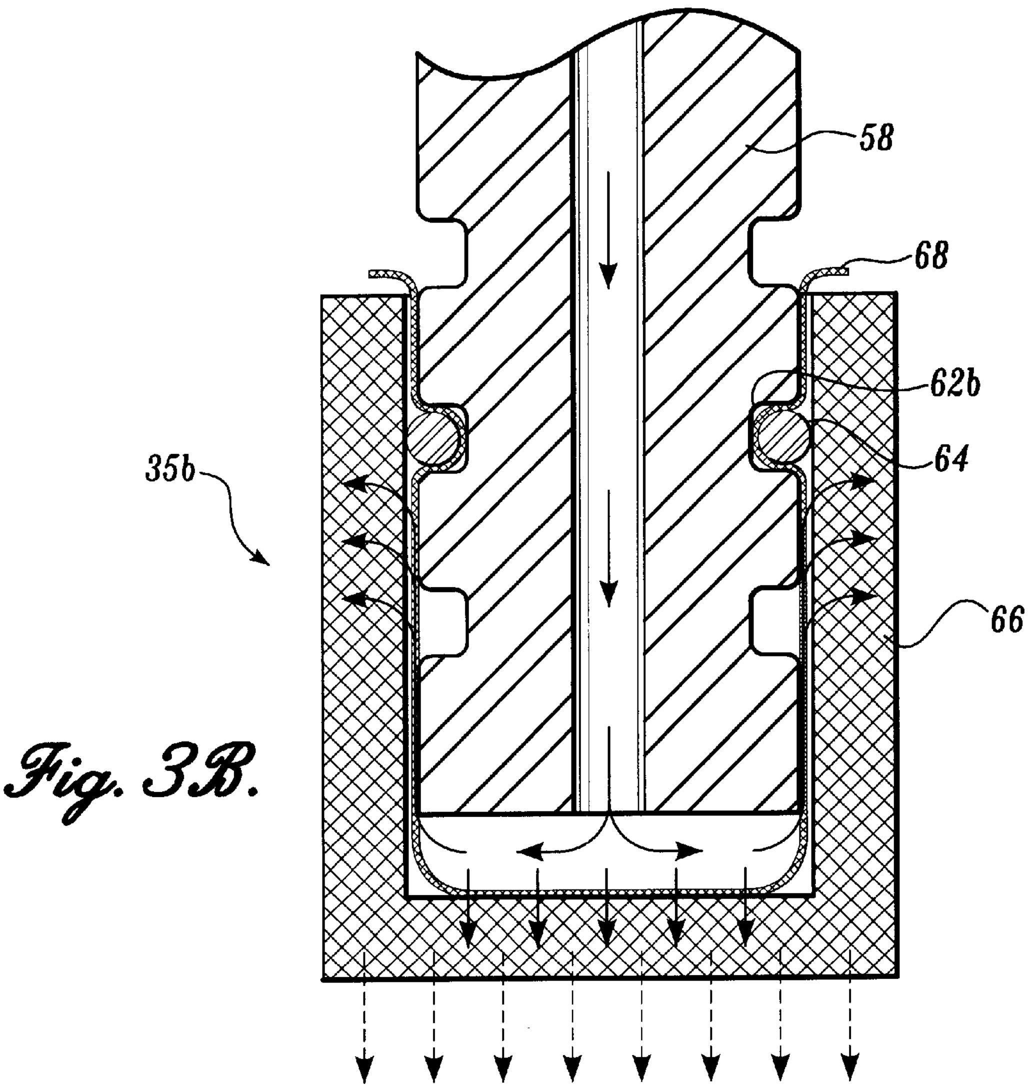

Referring additionally to FIG. 3B, to assemble the osmotic flow control device 35*b*, first the membrane 68 is slid over the male portion 58, and the O-ring 64 is placed over the membrane 68 to be received in one of the circumferential grooves 62*a*–62*c*, such as the middle circumferential groove 62*b*, as illustrated. Then, the female portion 66 is placed over the membrane 68 so as to form a fluid-tight seal with the male portion 58 along the O-ring 64. The O-ring 64 limits the area of the membrane 68 that allows fluid to permeate through to the area below the O-ring. Specifically, in operation, fluid flows down the passage 60 through the male portion 58 and inflates the membrane 68 slightly (up to where the O-ring 64 is placed), until the membrane 68 contacts the surface of the foraminous female portion 66. Fluid then permeates through the membrane below the O-ring 64, as indicated by arrows. The osmotic flow control device 35*b* may be fitted in-line in a cavity (not shown) so that the fluid exuding from the foraminous female portion 66, as indicated by dotted arrows, is directed downstream.

The female portion 66 need not be made of foraminous material. For example, the female portion 66 may be made of any nonforaminous material having rough interior surfaces, with which the male portion 58 covered with the permeable membrane 68 will interface. In this embodiment, the female portion 66 includes at least one outlet. In operation, fluid permeating through the membrane 68 below the O-ring 64 will flow over the rough surfaces of the female portion 66 until it exits therefrom through the outlet.

The osmotic flow control devices 35*a*, 35*b* described above are advantageous in that the permeable membrane serves to block backflow of ions or particulate contaminants, which are much larger than typical performance-enhancing compounds to which the membrane is adapted to be permeable.

Referring back to FIG. 1, the distribution conduits 26*a*, 26*b*, 26*c* for transporting the performance-enhancing fluid are formed of impermeable material, preferably metal, and further preferably copper or aluminum, or of low-permeable material, such as polytetrafluoroethylene or any suitable metallized plastic. The distribution conduits 26*a*, 26*b*, 26*c* extend generally in parallel with the cables 16*a*, 16*b*, 16*c*, respectively. In a preferred embodiment, the distribution conduits 26*a*, 26*b*, 26*c* are integrally formed with the cables 16*a*, 16*b*, 16*c*, respectively.

Figure 4A:
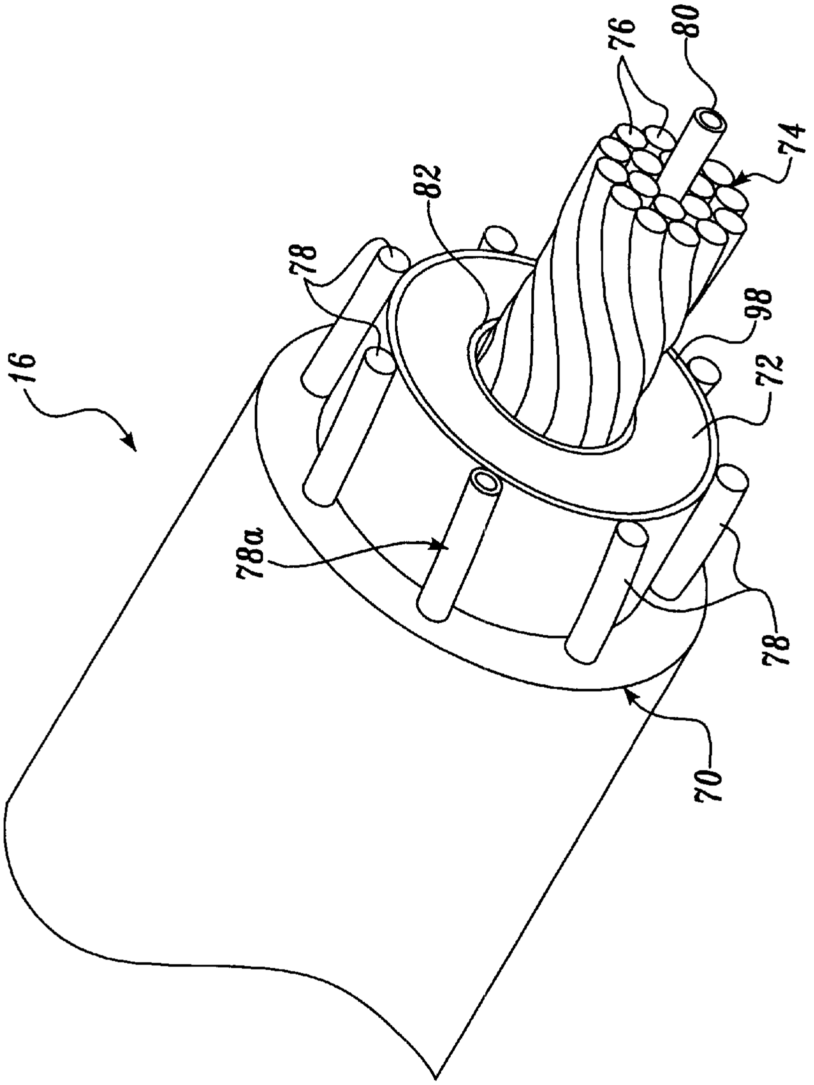
FIG. 4A illustrates a design of a cable incorporating a distribution conduit within, formed in accordance with the present invention.
Figure 4B:
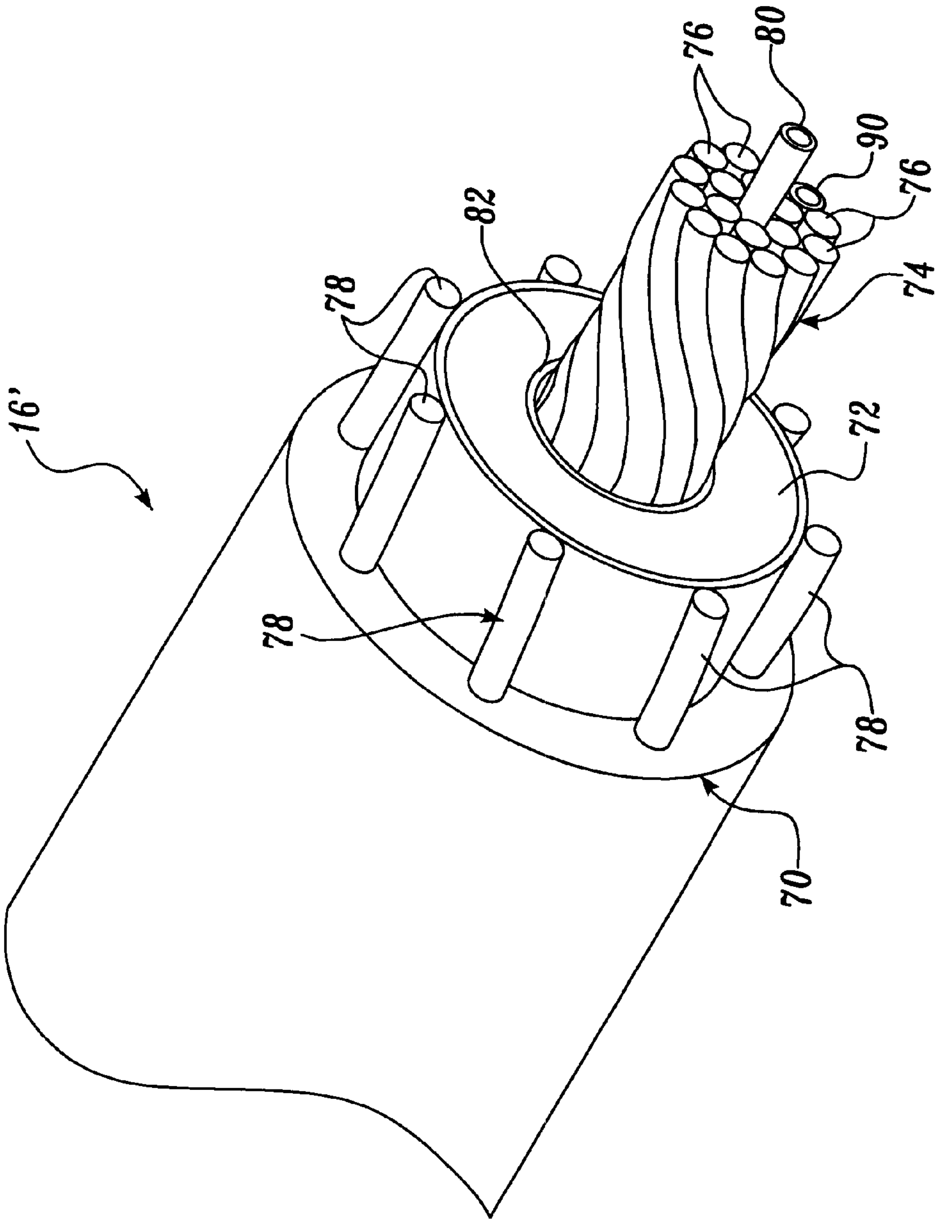
FIG. 4B illustrates another design of a cable incorporating a distribution conduit within, formed in accordance with the present invention.

FIGS. 4A and 4B illustrate nonlimiting examples of cable designs that incorporate the distribution conduit within. In FIG. 4A, a cable 16 for transmitting information includes a jacket 70, an insulation layer 72, and a conductive core 74 typically formed of multiple conductive strands 76. The cable 16 further includes a plurality of conductive neutral wires 78 embedded within the jacket 70, as well known in the art. The illustrated cable 16 further preferably includes a permeable conduit 80 extending through the core 74, which is to be described in detail below. In the embodiment illustrated in FIG. 4A, one of the neutral wires is replaced with a hollow tube 78*a* to serve as the distribution conduit in accordance with the present invention.

The configuration of the cable 16 is now described in detail. The jacket 70 is suitably an elongate tubular member formed from a polyethylene material. A plurality of longitudinally extending conductive neutral wires 78 are embedded within and extend the length of the jacket 70. The conductive neutral wires 78 are disposed annularly around the insulation layer 72. Though only one of the neutral wires is replaced with a tube 78*a* in the illustration, two or more neutral wires may be replaced with tubes, respectively, to serve as distribution conduits. The tube 78*a* is suitably formed of material that is impermeable or low-permeable to the performance-enhancing compound, to serve as the distribution conduit in accordance with the present invention. Preferably, the tube 78*a* is formed of conductive material, such as copper or aluminum, so as to also serve as a neutral wire. In this arrangement, the distribution conduit 78*a* is advantageously protected from corrosion and physical damage by the cable jacket 70.

The insulation layer 72 is suitably formed from a high molecular weight polyethylene (HMWPE) polymer, a crosslinked polyethylene (XLPE), an ethylenepropylene rubber (EPR) or other solid dielectrics, wherein each may include water tree retardants, fillers, antioxidants, UV stabilizers, etc. The insulation layer 72 is coaxially disposed within the jacket 70 and extends the length of the jacket 70.

The conductive core 74 is coaxially received within the jacket 70 and is centrally located therein. The conductive core 74 is surrounded by a semiconductive or insulating strand shield 82. The strand shield 82 is suitably formed from a compound that includes polyolefin or a similar material and may include carbon black to impart semiconductivity. The strand shield 82 surrounds the conductive core 74, such that it is disposed between the conductive core 74 and the insulation layer 72.

The conductive core 74 includes a plurality of electrically conductive strands 76 wound together to form the core, as is well known in the art. Although a plurality of conductive strands 76 is preferred, a cable having a single conductive strand is also within the scope of the present invention. Suitably, the strands 76 are formed from copper, aluminum, or other conductive material.

The permeable conduit 80 can be made of polyethylene, nylon, aromatic polyamides (e.g., Kevlar®), polytetrafluoroethylene, or other suitable polymeric materials. The conduit 80 is manufactured so that it is flexible and permeable to the performance-enhancing compound. Thus, the performance-enhancing compound can diffuse radially outwardly through the wall of the conduit and migrate through the cable strands 76 into the insulation layer 72 to increase the dielectric properties of the insulation. The permeable conduit 80 can also be made of other perforated or foraminous materials, for example, sintered metals. Though the permeable conduit 80 is illustrated to be disposed within the conductive core 74, it is to be understood that the permeable conduit 80 may be arranged at other locations within the cable 16, and further that two or more permeable conduits 80 may be provided within the cable, as long the conduit(s) 80 serve to diffuse the performnance-enhancing compound within the cable 16. Detailed description of a "flowthrough" cable incorporating one or more permeable conduits can be found in co-owned U.S. Pat. Nos. 6,350,947, filed Sep. 7, 1999, and 6,355,879, filed Apr. 13, 2000, both of which are explicitly incorporated herein by reference.

Referring back to FIG. 1, it is illustrated that the downstream end of the distribution conduit 26*a* is coupled to the cable 16*a* via an insulating housing, or an "elbow" 84, which is used to enclose a conductive cable termination to form a "dead-front" termination. A dead-front termination includes no exposed conductive surface, while a "live-front" termination includes an exposed conductive surface, as known in the art. Though the following description discusses conduit connection at a dead-front termination, it should be apparent that conduit connection may readily be made at a live-front termination, which does not include an insulating housing. It should also be understood that conduit connection for various other cables, including both electric cables and light-transmitting cables, will be apparent to those skilled in the art.

Figure 5:
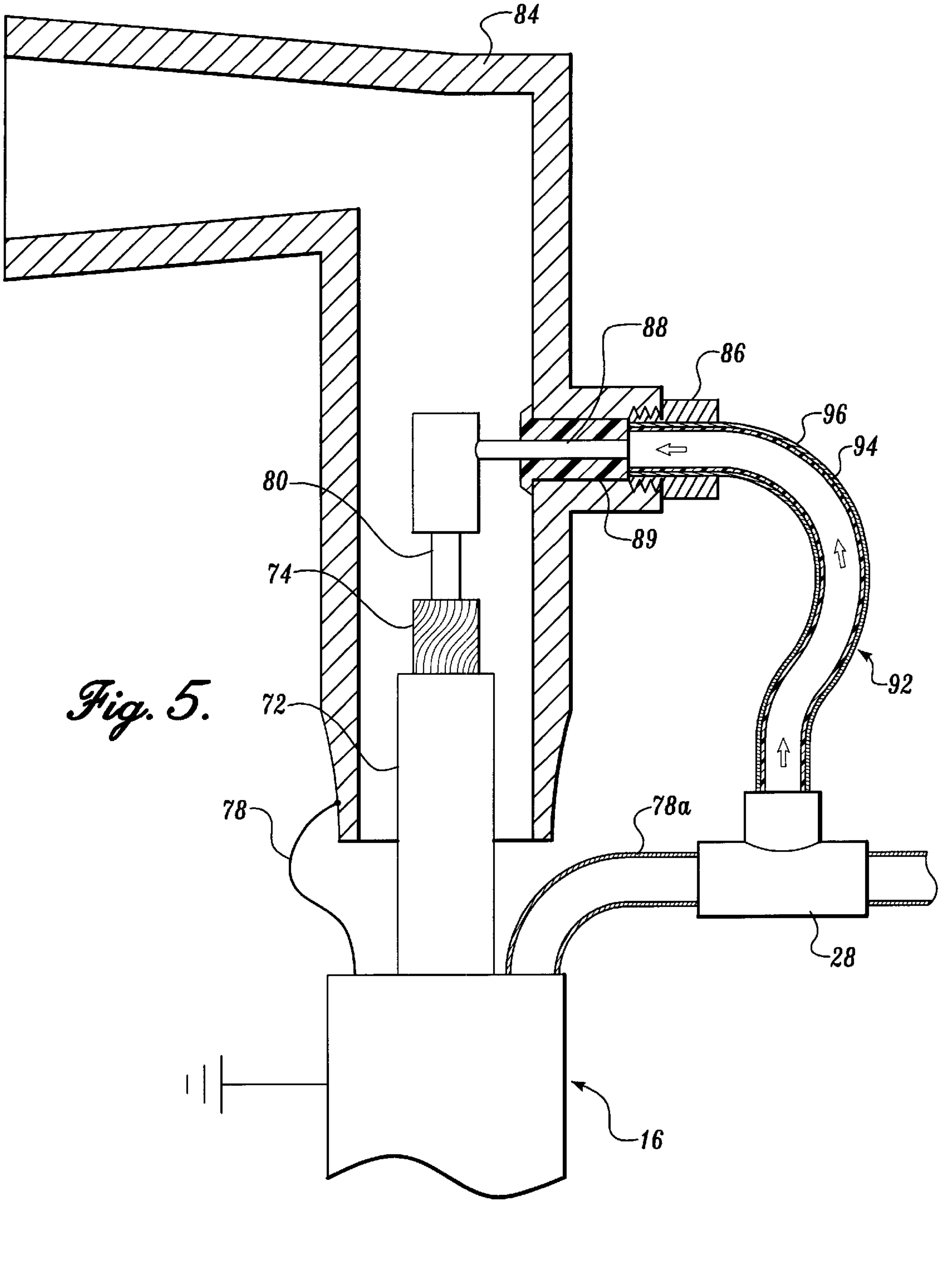
FIG. 5 is a schematic view of connection between a distribution conduit and a permeable conduit via an insulating "elbow"

FIG. 5 is a schematic view of the connection via an elbow 84 between the distribution conduit 78*a* and the permeable conduit 80 of the cable 16 of FIG. 4A. An exterior surface of the elbow is made of semiconducting material, and is arranged to provide a path to ground (via the neutral wire 78 in FIG. 5) so as not to accumulate any charge therein, as well known in the art. The elbow 84 includes a fluid injection port 86 and an insulated passage 88 that is surrounded by an insulating material 89. One end of the passage 88 remote from the fluid injection port 86 is adapted to fluidly communicate with the permeable conduit 80 extending through the cable 16. Thus, the performance-enhancing fluid from the distribution conduit 78*a* can be injected into the injection port 86 and the passage 88 into the permeable conduit 80, as indicated by arrows. It should be noted that, when the cable 16 does not include a permeable conduit, the performance-enhancing fluid from the distribution conduit 78*a* may be injected directly into the interstices between the strands of the conductive core 74. Conventional injection elbows are described in U.S. Pat. Nos. 4,946,393 and 5,082,449, the disclosures of which are explicitly incorporated herein by reference. Further, injection elbows and other termination arrangements for "flowthrough" cables (cables including a permeable conduit) are co-owned U.S. Pat. No. 6,489,554, filed Oct. 11, 2000, which is explicitly incorporated herein by reference.

FIG. 4B illustrates another embodiment of a cable 16' that incorporates a distribution conduit 90 within. The cable 16' is configured substantially the same as the cable 16 of FIG. 4A, and the same reference numbers refer to the same parts. In this cable 16' the distribution conduit 90 formed of a tube, such as a copper tube, is disposed within the conductive core 74. This embodiment may be advantageous in that there is no need to bridge potentials between the permeable conduit 80 and the distribution conduit 90 because they are at the same potential, unlike in the cable 16 of FIG. 4A.

Referring back to FIG. 5, in order to safely connect the distribution conduit 78*a* at ground potential to the permeable conduit 80 or to the conducting core 74 at line potential, through which the performance-enhancing fluid is fed, it is desirable to provide such a connection in a complete "dead-front" environment.

Figure 6:
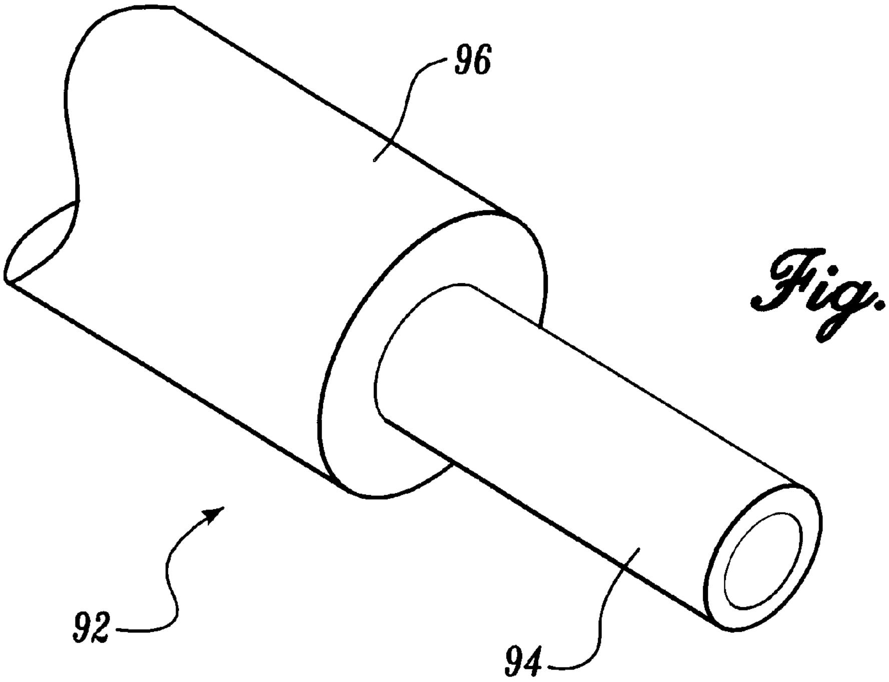
FIG. 6 illustrates a shielded dielectric tube, formed in accordance with the present invention.

To this end, the present invention provides a shielded dielectric tube 92, as illustrated in FIG. 6. The shielded dielectric tube 92 includes a dielectric inner tube 94 and a semiconducting or conducting outer tube 96 that surrounds the inner tube 94. The dielectric inner tube 94 is preferably made of polytetrafluoroethylene. The outer tube 96 may be formed of flexible metallic mesh, or preferably an extruded semiconductor such as a polyolefin loaded with carbon black. Preferably, the outer tube 96 is easily strippable from the inner tube 94.

For dead-front applications, referring additionally to FIG. 5, the shielded dielectric tube 92 is arranged to extend between the injection port 86 of the semiconducting elbow 84 and the distribution conduit 78*a* (via "tee" connector 28 in FIG. 5). The semiconducting or conducting outer tube 96 is placed in intimate contact with the semiconducting elbow 84 at one end and the conductive distribution conduit 78*a* at the other end to provide a continuous path to ground. Thus, while the performance-enhancing fluid flows through the dielectric inner tube 94 and into the insulated passage 88, the semiconducting outer tube 96 is safely coupled to ground. It should be noted that the shielded dielectric tube 92 may also be used with a live-front termination, to provide a dielectric inner passage to the performance-enhancing fluid while providing a path to ground via its outer conductive tube.

In accordance with one aspect of the present invention, various means for controlling diffusion of the performance-enhancing fluid within a cable system to achieve a predetermined permeation rate through the cable are provided. The term "permeation rate through a cable" is used herein as the volume of a performance-enhancing compound delivered to a cable having a predetermined cross-sectional geometry per unit time and per unit length. Diffusion control is desirable so as to prevent wasteful overfeeding of the fluid into a cable, to minimize the chances for spills and leaks and also to minimize the damages of spills and leaks in the event they occur, and further to address the issue of "supersaturation". One approach for accomplishing controlled diffusion is to use osmotic flow control devices, such as those described above in reference to FIGS. 2A, 2B and 3A, 3B. Referring back to FIG. 1, by strategically arranging one or more osmotic flow control devices along one or more of the cables 16*a*, 16*b*, 16*c*, one may control the permeation or the distribution of the performance-enhancing compound in a generally axial direction through each and every cable or cable segment. Permeation of the compound through each of the osmotic flow control devices may be finely adjusted by varying the permeable membrane material and/or the area of the permeable membrane that is available for the permeation of the compound, as described above in reference to FIGS. 2A–3B. Preferably, an osmotic flow control device is arranged at a feeding point termination 18*a* of each cable. As noted above, use of an osmotic flow control device has a further advantage of preventing backflow of ionic or particulate contaminants. Thus, an osmotic flow control device arranged at a termination 18*a* of each cable prevents backflow of undesirable material into a distribution conduit 78*a* and a shielded dielectric tube 92 (see FIG. 5).

Another approach for controlling diffusion of the performance-enhancing fluid through the cable is to carefully design the cable itself to control the compound permeation in a generally radial direction to achieve a predetermined permeation rate through the cable. Specifically, the permeation rate may be controlled by carefully selecting the geometry (size, shape, thickness, etc.) and material of a permeable conduit (80 in FIG. 4A), the cable strand compression (how tightly the cable strands 76 are wound together), the material of a strand shield (82 in FIG. 4A), the material used to fill the interstices between the strands (strand-blocking material), such as polyisobutylene, and/or the dielectric material used to form the insulation 72, such as polyolefin or polytetrafluoroethylene. For example, more compression of the cable strands would lower the permeation rate along the tight strand interfaces. Further, a permeable conduit made of polytetrafluoroethylene versus polyethylene would lower the permeation rate through the cable because the former will lower the solubility and hence the permeation of typical performance-enhancing compounds therethrough. Similarly, the degree of permeability of the strand shield material, the strand-blocking material, and the insulation material to a particular performance-enhancing compound can be altered by one of ordinary skill in the manufacture of polymeric material, so as to achieve a desired permeation rate through the cable. In this regard, altering the solubility of a performance-enhancing compound through a particular material to achieve a predetermined permeation rate through the cable is also a part of the present means for controlled diffusion. Furthermore, if it is desirable to slow down the permeation rate, an independent permeable layer made of suitable material, such as polytetrafluoroethylene, may be added between the insulation 72 and the strand shield 82.

The cable thus constructed in accordance with the second approach described above is well suited for meeting varying temperature-dependent needs of the cable for the performance-enhancing compound. Because the permeation rate through the cable thus constructed increases with increasing temperature, more performance-enhancing fluid is delivered through the cable when the current loading, and hence the cable temperature, are higher. Since higher cable temperatures increase the absorption of water within the cable insulation, the cable balances the flow of fluid to meet a varying requirement for the performance-enhancing fluid.

The two approaches for controlled diffusion as described above, one using osmotic flow control devices and the other using specifically designed cables, may be used in combination to draw on their respective advantages.

To control diffusion of the performance-enhancing compound within a cable, and further to address the issue of supersaturation, the present invention proposes the use of an organosilicone fluid as a performance-enhancing fluid. Such an organosilicone fluid comprises silanes of the general formula:

$$(RO)_x SiR'_y R''_z R'''_{(4-x-y-z)} \quad (1)$$

where R denotes an aliphatic, aromatic, or an arene radical with 1 to 12 carbon atoms but preferably 1 to 2 carbon atoms; R' denotes an aliphatic, aromatic, or an arene radical with 1 to 12 carbon atoms; R" denotes an aliphatic, aromatic, or an arene radical with 1 to 12 carbon atoms; and R'" denotes an aliphatic, aromatic, or an arene radical with 1 to 12 carbon atoms and mixtures and partial hydrolysates thereof. The subscript "x" must be from 1 to 4, but preferably 1. The subscripts "y" and "z" are from 0 to 4, but the sum of x, y, z, and 4-x-y-z must be 4. The aliphatic, aromatic, or arene radicals may be substituted with halogens, hydroxy or other radicals without departing from the spirit of this invention. Such substitutions can be used to control its solubility or diffusivity, and/or to add functionality, such as UV stabilization, antioxidation, or other desirable properties to extend the life of the cable. Examples of materials, which are encompassed within this general formula, are phenyldimethylmethoxysilane, trimethylisopropoxysilane, trimethylethoxysilane, dimethyldimethoxysilane, dimethyldiethoxysilane, phenylmethyldimethoxysilane, naphthlamethyldiexthoxysilane, methyltrimethoxysilane, bromophenylethyldiethoxysilane, their ethoxy equivalents, their propoxy equivalents, and their partial hydrolyzates.

The alkoxy functionality and especially monoalkoxy functionality (x=1) designated in the general formula above as $(RO)_x$ serves to limit the extent of oligomerization, to thereby control radial diffusion of the compound and also to address the problem of supersaturation. Specifically, this alkoxy functionality provides for the hydrolysis and condensation reaction with water, which is ubiquitous in either the liquid or vapor state in the environments where the cable is installed. The monoalkoxy materials, either in essentially pure form or in mixtures that are predominantly monoalkoxy, can be utilized to end-block the glowing oligomer chain to prevent excess oligomerization of the fully hydrolyzed material. As a result, the oligomers resulting from the desiccation reaction will have low degrees of polymerization, or "dp". For example, if the continuously fed radical chemical desiccant is 100% monoalkoxy, the maximum dp will be 2. Consequently, more materials will be available to react with water, and thus excess delivery of the materials to the cable, or supersaturation, may be mitigated. Controlling oligomerization of the compound to prevent its excess delivery to the cable also allows for controlling radial diffusion of the compound, to achieve a desired permeation rate of the compound through the cable. A mixture of compounds made up on a molar basis with x=2 and x=1 can be utilized to generate virtually any average dp. For example, if the molar ratio of x=2 to x=1 were 10:1, the resulting siloxane mixture would have an average dp of 5. Thus, the permeation rate of the oligomer out of the cable can be controlled, while mitigating supersaturation, for any cable geometry or cable operating temperature by judiciously choosing an appropriate molar ratio of x=1 and x=2 compounds.

While the continuous feeding and controlled diffusion of the performance-enhancing compound into a cable system, as described above, are well suited for treating both old and new cables, there is an additional advantage in applying the present invention to a new cable system. Specifically, by continuously and controllably diffusing the performance-enhancing compound through a new cable, one may limit the growth of water trees to thereby maintain the dielectric properties of the cable insulation substantially intact. This in turn allows for forming a new cable with relatively thinner and inexpensive insulation materials. For example, a typical 15 kV cable currently has 175 mil-thick (referred to in the art as 100% insulation) or 220 mil-thick (referred to in the art as 130% insulation) TRXLPE (tree retardant crosslinked polyethylene) material as insulation. However, only 70 mils (40%) of less expensive XLPE material will suffice for the same application if the new cable is constructed and maintained in accordance with the present invention. Also, relatively inexpensive furnace black (an inexpensive carbon black formulation, which has fallen out of favor in the cable manufacturing industry and has often been replaced with acetylene black) may be used as the semiconductive filler to form an insulation shield and a strand shield for radially surrounding the insulation and the conductor strands, respectively, if the new cable is to be treated in accordance with the present invention. (Insulation shield is illustrated as "98" in FIG. 4A.) Use of a thinner insulation and less expensive materials for forming a cable renders both the initial installation cost and the life-cycle cost of the installed cable system considerably less than a contemporary distribution cable system. The present invention thusly described provides several advantages over distribution cable systems and cable feeding systems currently available in the art. First, since multiple-cable subsystems, or cables, are fed with a performance-enhancing compound using a central feed station, the costs of maintaining the single central feed station are significantly lower than the costs of maintaining multiple feeding equipment as required in the past. Second, because diffusion of a performance-enhancing compound throughout the cable system, in particular the diffusion in a generally radial direction, is controlled by various means, continuous axial flushing of treatment fluid is not required. Controlled diffusion allows for only an optimal amount of performance-enhancing compound to be fed into the cable system, reducing accidental spill and waste. Further, controlled diffusion prevents a "supersaturation" condition, thereby optimally utilizing the performance-enhancing compound. Third, continuous feeding and controlled diffusion of the performance-enhancing compound, when applied in a new cable, allow for the insulation of the cable to maintain its initial dielectric properties substantially intact. This obviates the need to overdesign a new cable, allowing for a new cable to be constructed with less expensive materials. The cable itself can be maintained and operated at a fraction of the cost of conventional cable distribution systems and the life of such a system can be varied by the system operator from several years to several hundreds of years. Fourth, the shielded dielectric tube of the present invention allows for formation of a complete "dead-front" termination while safely feeding a performance-enhancing fluid into the termination.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A distributed feed system for use in a cable system, the cable system including at least two cable subsystems, each cable subsystem comprising a distribution conduit and a permeable conduit extending though the cable subsystem, the distributed feed system being adapted to feed a performance enhancing compound into each of the cable subsystems and comprising:

a central feed station including a tank for holding the performance enhancing compound;

said distribution conduit connects the central feed station to each of the cable subsystems to permit distribution of the performance enhancing compound therethrough to each of the cable subsystems; and said permeable conduit, in fluid communication with said distribution conduit, distributes and diffuses said performance enhancing compound within said cable subsystem.

2. The distributed feed system of claim 1, wherein the central feed station further comprises a first flow control system coupled to the tank and adapted to controllably release the performance-enhancing compound from the tank.

3. The distributed feed system of claim 2, wherein the first flow control system of the central feed station comprises one or more orifices.

4. The distributed feed system of claim 2, wherein the first flow control system of the central feed station comprises:

a shutoff valve; and a flow measurement instrument coupled to the shutoff valve, the flow measurement instrument being adapted to actuate the shutoff valve upon measurement of a flow rate in excess of a predetermined value.

5. The distributed feed system of claim 2, wherein the first flow control system of the central feed station comprises an osmotic flow control device.

6. The distributed feed system of claim 5, wherein the osmotic flow control device comprises:

a permeable membrane; and a frame placed over the membrane to expose a predetermined area of the membrane through the frame to the performance-enhancement compound.

7. The distributed feed system of claim 6, wherein the frame is an adjustable size so as to selectively vary the area of the membrane to be exposed therethrough.

8. The distributed feed system of claim 7, wherein the adjustable size frame comprises plural pairs of washers, each pair of washers being adapted to sandwich the membrane therebetween and comprising;

a first washer including an aperture; and a second washer including a boss adapted to be received within the aperture of the first washer, the second washer further including a bore axially extending through the boss;

wherein the size of the aperture of the first washer varies among the plural pairs of washers.

9. The distributed feed system of claim 7, wherein the adjustable size frame comprises:

an impermeable male portion having a length dimension, the male portion including a passage extending therethrough along its length; and a female portion adapted to receive the male portion therein;

wherein the membrane is shaped to enclose one longitudinal end of the male portion; and wherein the male portion enclosed by the membrane, when received within the female portion, establishes an annular seal with the female portion at a selected location along the length of the male portion.

10. The distributed feed system of claim 9, wherein the adjustable size frame further comprises an O-ring, the male portion including a plurality of circumferential grooves defined along its length for receiving the O-ring therein to establish an annular seal with the female portion.

11. The distributed feed system of claim 1, further comprising a communication network including a central database, wherein the central feed station further comprises a data communication device for transmitting data, relating to the central feed station, to the central database via the network.

12. The distributed feed system of claim 11, wherein the data communication device comprises a radio.

13. The distributed feed system of claim 12, wherein the data communication device comprises a cellular radio.

14. The distributed feed system of claim 11, wherein the communication network comprises the Internet.

15. The distributed feed system of claim 11, wherein the central feed station further comprises a level measurement device adapted for measuring the remaining amount of the performance-enhancement compound left in the tank, and the data transmitted to the central database includes the measurement obtained by the level measurement device.

16. The distributed feed system of claim 11, wherein the data communication device periodically transmits data, relating to the central feed station, to the central database.

17. The distributed feed system of claim 11, wherein the data communication device transmits data, relating to the central feed station, to the central database upon an occurrence of a predetermined event.

18. The distributed feed system of claim 1, wherein the cable system comprises a plurality of cables for transmitting information, each cable extending between two terminations to form each of the cable subsystems, the cables being arranged to connect each of the cable subsystems with the feed station, and the distribution conduit being integrally formed with each of the cables.

19. The distributed feed system of claim 18, wherein the distribution conduit comprises metal.

20. The distributed feed system of claim 19, wherein the distribution conduit comprises material selected from the group consisting of copper and aluminum.

21. The distributed feed system of claim 18, wherein the cable comprises:

a housing;

an information-conducting core disposed within the housing;

an insulation layer surrounding the core; and a tube disposed radially outside the insulation layer and within the housing, the tube serving as the distribution conduit.

22. The distributed feed system of claim 21, wherein the tube additionally serves as a neutral wire.

23. The distributed feed system of claim 22, wherein the tube comprises metal.

24. The distributed feed system of claim 23, wherein the tube comprises material selected from the group consisting of copper and aluminum.

25. The distributed feed system of claim 18, wherein the cable comprises:

a housing;

an information-conducting core disposed within the housing, the conducting core including a tube to serve as the distribution conduit; and an insulation layer surrounding the core.

26. The distributed feed system of claim 25, wherein the tube comprises metal.

27. The distributed feed system of claim 26, wherein the tube comprises material selected from the group consisting of copper and aluminum.

28. The distributed feed system of claim 18, further comprising a second flow control device disposed along at least one of the cables.

29. The distributed feed system of claim 28, wherein the second flow control device is disposed at one of the terminations of at least one of the cables.

30. The distributed feed system of claim 28, wherein the second flow control device comprises an osmotic flow control device.

31. The distributed feed system of claim 30, wherein the osmotic flow control device comprises:

a permeable membrane; and a frame placed over the membrane to expose a certain area of the membrane through the frame to the performance-enhancement compound.

32. The distributed feed system of claim 31, wherein the frame is an adjustable size so as to selectively vary the area of the membrane to be exposed therethrough.

33. The distributed feed system of claim 32, wherein the adjustable size frame comprises plural pairs of washers, each pair of washers being adapted to sandwich the membrane therebetween and comprising:

a first washer including an aperture; and a second washer including a boss adapted to be received within the aperture of the first washer, the second washer further including a bore axially extending through the boss;

wherein the size of the aperture of the first washer varies among the plural pairs of washers.

34. The distributed feed system of claim 32, wherein the adjustable size frame comprises:

a male portion having a length dimension, the male portion including a passage extending therethrough along its length; and a female portion adapted to receive the male portion therein;

wherein the membrane is shaped to enclose one longitudinal end of the male portion; and wherein the male portion enclosed by the membrane, when received within the female portion, establishes an annular seal with the female portion at a selected location along the length of the male portion.

35. The distributed feed system of claim 34, wherein the adjustable size frame further comprises an O-ring, the male portion including a plurality of circumferential grooves defined along its length for receiving the O-ring therein to establish an annular seal with the female portion.

36. The distributed feed system of claim 18, wherein each of the cables comprises a permeable conduit axially disposed within, the permeable conduit being adapted to permit a performance-enhancing compound to flow therethrough, the permeable conduit being permeable to the compound to permit the compound to migrate radially outwardly through the permeable conduit into the cable, wherein the distribution conduit is coupled to the permeable conduit of each of the cables.

37. The distributed feed system of claim 36, wherein the permeable conduit is adapted to allow the compound to migrate therethrough to achieve a predetermined permeation rate of the compound through the cable.

38. The distributed feed system of claim 37, wherein the permeation rate is predetermined by selectively adjusting at least one factor selected from the group consisting of:

material forming the permeable conduit;

geometry of the permeable conduit; and materials forming the cable.

39. The distributed feed system of claim 18, wherein the cable comprises:

a plurality of strands wrapped about a central axis;

strand-blocking material filled within interstices among the plurality of strands;

a strand shield surrounding the plurality of strands; and an insulation layer surrounding the strand shield;

wherein the cable is designed to achieve a predetermined permeation rate of the compound through the cable, and wherein the permeation rate is predetermined by selectively adjusting at least one factor selected from the group consisting of strand compression, the strand-blocking material, material forming the strand shield, and material forming the insulation layer.

40. The distributed feed system of claim 18, wherein the cable comprises an information-conducting core, a strand shield surrounding the core, and an insulation layer surrounding the strand shield, further comprising a permeable layer provided between the strand shield and the insulation layer to achieve a predetermined permeation rate of the compound through the cable.

41. The distributed feed system of claim 18, further comprising:

a shielded tube including a dielectric inner tube and a semiconducting or conducting outer tube surrounding the inner tube; and an insulating housing;

wherein the distribution conduit fluidly communicates with an end of one of the cables within the insulating housing, the outer tube of the shielded tube being coupled at one end to the distribution conduit and at the other end to the insulating housing.

42. The distributed feed system of claim 41, wherein the inner tube comprises polytetrafluoroethylene.

43. The distributed feed system of claim 41, wherein the outer tube comprises metallic mesh.

44. The distributed feed system of claim 41, wherein the outer tube comprises an extruded semiconductor.

45. The distributed feed system of claim 1, wherein the performance-enhancing compound comprises a silane of the formula:

$$(RO)_xSiR'_yR''_zR'''_{(4-x-y-z)}$$

wherein R comprises an aliphatic, aromatic, or arene group having 1 to 12 carbon atoms, R' comprises an aliphatic, aromatic, or arene group having 1 to 12 carbon atoms, R" comprises an aliphatic, aromatic, or arene group having 1 to 12 carbon atoms, and R'" comprises an aliphatic, aromatic, or arene group having 1 to 12 carbon atoms and mixtures and partial hydrolysates thereof, wherein x is from 1 to 4, y and z are from 0 to 4, and the sum of x, y, z and 4-x-y-z is 4.

46. The distributed feed system of claim 45, wherein x is selected to control oligomerization of the compound.

47. The distributed feed system of claim 46, wherein x is 1.

48. The distributed feed system of claim 46, wherein x is 2.

49. The distributed feed system of claim 45, wherein the compound is selected from the group consisting of phenyldimethylmethoxysilane, trimethylisopropoxysilane, trimethylethoxysilane, dimethyldimethoxysilane, dimethyldiethoxysilane, phenylmethyldimethoxysilane, naphthlamethyldiexthoxysilane, methyltrimethoxysilane, bromophenylethyldiethoxysilane, their ethoxy equivalents, their propoxy equivalents, and their partial hydrolyzates.

* * * * *